United States Patent
Patton

(10) Patent No.: US 9,591,729 B2
(45) Date of Patent: Mar. 7, 2017

(54) ELECTRIC LIGHTING DEVICES THAT SIMULATE A FLICKERING FLAME

(71) Applicant: Luminara Worldwide, LLC, Eden Prairie, MN (US)

(72) Inventor: Douglas Patton, Irvine, CA (US)

(73) Assignee: Luminara Worldwide, LLC, Eden Prairie, MN (US)

( * ) Notice: Subject to any disclaimer, the term of this patent is extended or adjusted under 35 U.S.C. 154(b) by 20 days.

(21) Appl. No.: 14/764,438

(22) PCT Filed: Jan. 30, 2014

(86) PCT No.: PCT/US2014/013740
§ 371 (c)(1),
(2) Date: Jul. 29, 2015

(87) PCT Pub. No.: WO2014/120864
PCT Pub. Date: Aug. 7, 2014

(65) Prior Publication Data
US 2015/0362142 A1    Dec. 17, 2015

Related U.S. Application Data

(60) Provisional application No. 61/758,602, filed on Jan. 30, 2013.

(51) Int. Cl.
*B60Q 1/14* (2006.01)
*H05B 37/02* (2006.01)
(Continued)

(52) U.S. Cl.
CPC ........ *H05B 37/0272* (2013.01); *F21S 10/043* (2013.01); *F21S 10/046* (2013.01);
(Continued)

(58) Field of Classification Search
CPC .. H05B 37/0272; F21S 10/043; F21S 10/046; F21V 5/007; F21V 11/18;
(Continued)

(56) References Cited

U.S. PATENT DOCUMENTS 3,639,749 A * 2/1972 Beckman ................ F21S 10/04
362/392
4,551,794 A * 11/1985 Sandell ................... F21S 6/001
362/392

(Continued)

FOREIGN PATENT DOCUMENTS

CN    102734740    10/2012
CN    202747231 U    2/2013
(Continued)

*Primary Examiner* — Bryon T Gyllstrom
(74) *Attorney, Agent, or Firm* — Fish & Tsang LLP

(57) ABSTRACT

Various embodiments of electric lighting devices, and especially electric candles, are described. The devices include a projection screen onto which light can be emitted. Advantageously, the projection screen can move with respect to the device's housing to thereby create a flickering flame effect. The device can include one or more magnets disposed outside of the housing that can interact with an electromagnetic field generated by the device to thereby move the projection screen.

19 Claims, 2 Drawing Sheets

(51) Int. Cl.

| | | |
|---|---|---|
| *F21V 33/00* | (2006.01) | |
| *F21V 11/18* | (2006.01) | |
| *F21V 23/04* | (2006.01) | |
| *F21V 5/00* | (2015.01) | |
| *F21V 23/00* | (2015.01) | |
| *H04N 9/31* | (2006.01) | |
| *F21S 10/04* | (2006.01) | |
| *F21V 17/02* | (2006.01) | |
| *F21V 17/10* | (2006.01) | |
| *F21V 31/00* | (2006.01) | |
| *F21Y 113/00* | (2016.01) | |
| *F21W 121/00* | (2006.01) | |

(52) U.S. Cl.
 CPC ............. *F21V 5/007* (2013.01); *F21V 11/18* (2013.01); *F21V 17/02* (2013.01); *F21V 17/10* (2013.01); *F21V 23/003* (2013.01); *F21V 23/0442* (2013.01); *F21V 31/00* (2013.01); *F21V 33/0028* (2013.01); *F21V 33/0052* (2013.01); *H04N 9/31* (2013.01); *F21V 23/0464* (2013.01); *F21V 23/0471* (2013.01); *F21W 2121/00* (2013.01); *F21Y 2113/00* (2013.01); *F21Y 2113/10* (2016.08)

(58) Field of Classification Search
 CPC ........ F21V 17/02; F21V 17/10; F21V 23/003; F21V 23/0442; F21V 33/0028; F21V 33/0052
 USPC ....................................................... 362/284
 See application file for complete search history.

(56) References Cited

U.S. PATENT DOCUMENTS

| | | | |
|---|---|---|---|
| 7,159,994 B2 | 1/2007 | Schnuckle et al. | |
| 7,261,455 B2 | 8/2007 | Schnuckle et al. | |
| 7,350,720 B2 | 4/2008 | Jaworski et al. | |
| 7,481,571 B2 | 1/2009 | Bistritzky et al. | |
| 7,503,668 B2 | 3/2009 | Porchia et al. | |
| 7,686,471 B2 | 3/2010 | Reichow | |
| 7,824,627 B2* | 11/2010 | Michaels | A01M 1/205 239/102.2 |
| 7,837,355 B2 | 11/2010 | Schnuckle | |
| 8,070,319 B2 | 12/2011 | Schnuckle et al. | |
| 8,132,936 B2 | 3/2012 | Patton et al. | |
| 8,342,712 B2 | 1/2013 | Patton et al. | |
| 8,534,869 B2 | 9/2013 | Patton et al. | |
| 8,550,660 B2 | 10/2013 | Patton et al. | |
| 8,646,946 B2 | 2/2014 | Schnuckle et al. | |
| 8,696,166 B2 | 4/2014 | Patton et al. | |
| 8,721,118 B2 | 5/2014 | Patton et al. | |
| 8,727,569 B2 | 5/2014 | Schnuckle et al. | |
| 8,789,986 B2 | 7/2014 | Li | |
| 8,926,137 B2 | 1/2015 | Li | |
| 9,133,992 B2 | 9/2015 | Lee | |
| 2001/0033488 A1 | 10/2001 | Chliwnyj et al. | |
| 2005/0169666 A1 | 8/2005 | Porchia et al. | |
| 2005/0285538 A1 | 12/2005 | Jaworski et al. | |
| 2006/0034100 A1* | 2/2006 | Schnuckle | B44C 5/06 362/161 |
| 2006/0039835 A1 | 2/2006 | Nottingham et al. | |
| 2006/0125420 A1 | 6/2006 | Boone et al. | |
| 2007/0127249 A1 | 6/2007 | Medley et al. | |
| 2008/0031784 A1 | 2/2008 | Bistritzky et al. | |
| 2008/0038156 A1 | 2/2008 | Jaramillo | |
| 2008/0130266 A1 | 6/2008 | DeWitt et al. | |
| 2008/0150453 A1 | 6/2008 | Medley et al. | |
| 2010/0079999 A1 | 4/2010 | Schnuckle | |
| 2011/0027124 A1 | 2/2011 | Albee et al. | |
| 2011/0110073 A1* | 5/2011 | Schnuckle | F21S 10/04 362/96 |
| 2011/0127914 A1* | 6/2011 | Patton | F21S 10/04 315/76 |
| 2011/0317403 A1 | 12/2011 | Fournier et al. | |
| 2012/0020052 A1 | 1/2012 | McCavit et al. | |
| 2012/0024837 A1 | 2/2012 | Thompson | |
| 2012/0093491 A1 | 4/2012 | Browder et al. | |
| 2012/0134157 A1* | 5/2012 | Li | F21S 6/001 362/277 |
| 2012/0300459 A1 | 11/2012 | Hau et al. | |
| 2014/0177212 A1 | 6/2014 | Li | |
| 2014/0362592 A1 | 12/2014 | Lee | |
| 2015/0109786 A1 | 4/2015 | Li | |
| 2015/0338087 A1* | 11/2015 | Fang | F24F 3/056 362/96 |
| 2016/0109081 A1* | 4/2016 | Thompson | F21S 10/046 362/96 |
| 2016/0116127 A1* | 4/2016 | Patton | F21S 6/001 362/284 |

FOREIGN PATENT DOCUMENTS

| | | |
|---|---|---|
| CN | 202884785 U | 4/2013 |
| CN | 102721002 B | 6/2014 |
| EP | 1878449 A1 | 1/2008 |
| WO | 2006020839 | 2/2006 |
| WO | 2010039347 | 4/2010 |
| WO | 2012000418 | 1/2012 |
| WO | 2014036968 | 3/2014 |

\* cited by examiner

ELECTRIC LIGHTING DEVICES THAT SIMULATE A FLICKERING FLAME

This application is a U.S. National Stage filing of PCT/US14/13740, filed Jan. 30, 2014, which claims the benefit of priority to U.S. provisional application having serial no. 61/758,602 filed on Jan. 30, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is electric lighting devices, and especially lighting devices configured to simulate a flickering flame.

BACKGROUND

The following background discussion includes information that may be useful in understanding the present invention. It is not an admission that any of the information provided herein is prior art or relevant to the presently claimed invention, or that any publication specifically or implicitly referenced is prior art.

Various electric lights are known in the art. See, e.g., U.S. Pat. No. 8,132,936 to Patton et al., U.S. Pat. No. 8,070,319 to Schnuckle et al., U.S. Pat. No. 7,837,355 to Schnuckle et al., U.S. Pat. No. 7,261,455 to Schnuckle et al., U.S. Pat. No. 7,159,994 to Schnuckle et al., U.S. pat. publ. no. 2011/0127914 to Patton et al., U.S. Pat. No. 7,350,720 to Jaworski et al.; U.S. Pat. No. 7,686,471 to Reichow; U.S. pat. publ. no. 2005/0285538 to Jaworski et al. (publ. December 2005); U.S. Pat. No. 7,481,571 to Bistritzky et al.; U.S. pat. publ. no. 2008/0031784 to Bistritzky et al. (publ. February 2008); U.S. pat. publ. no. 2006/0125420 to Boone et al. (publ. June 2006); U.S. pat. publ. no. 2007/0127249 to Medley et al. (publ. June 2007); U.S. pat. publ. no. 2008/0150453 to Medley et al. (publ. June 2008); U.S. pat. publ. no. 2005/0169666 to Porchia, et al. (publ. August 2005); U.S. Pat. No. 7,503,668 to Porchia, et al.; U.S. Pat. No. 7,824,627 to Michaels, et al.; U.S. pat. publ. no. 2006/0039835 to Nottingham et al. (publ. February 2006); U.S. pat. publ. no. 2008/0038156 to Jaramillo (publ. February 2008); U.S. pat. publ. no. 2001/0033488 to Chliwnyj ; U.S. pat. publ. no. 2008/0130266 to DeWitt et al. (publ. June 2008); U.S. pat. publ. no. 2012/0024837 to Thompson (publ. February 2012); U.S. pat. publ. no. 2011/0134628 to Pestl et al. (publ. June 2011); U.S. pat. publ. no. 2011/0027124 to Albee et al. (publ. February 2011); U.S. pat. publ. no. 2012/0020052 to McCavit et al. (publ. January 2012); U.S. pat. publ. no. 2012/0093491 to Browder et al. (publ. April 2012); and European publ. no. 1878449. However, while various mechanisms have been used to more closely simulate a flickering flame of in an electric candle, such mechanisms fail to appreciate that the magnets can be disposed outside of the housing.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for improved electric candles and other light sources that imitate a flickering flame and have a reduced cost of manufacture.

SUMMARY OF THE INVENTION

The inventive subject matter provides apparatus, systems and methods in which one can simulate a flickering flame in an electric lighting device, such as a candle or light bulb. Preferred devices include a projection screen coupled to a housing such that some or all of the projection screen extends from the housing. Light can be projected onto an outer surface of the projection screen using one or more, and preferably at least two light sources. It is especially preferred that the device can include three or more light sources that collectively emit light on to a surface of the projection screen.

The projection screen preferably can move with respect to the housing, and may pivot about an articulation point. It is especially preferred that the projection screen include one or more magnets that can interact with a magnetic field generated by an electromagnet. As used herein, the term "magnet" is defined to include magnets and ferrous materials. For example, the projection screen can have small, molded-in pieces of ferrous material and be considered to have a magnet under this definition.

Rather than dispose the magnets within the housing as in prior art devices, the magnet(s) can be disposed outside of the housing in the portion of the projection screen extending from the housing. This advantageously allows the electric candle to be shrunk allowing additional form factors such as a tea light candle, and the electromagnetic coil can be placed immediately below the housing's top surface where it can generate a time-varying electromagnetic field.

Alternatively or additionally, the magnet can be disposed above an articulation point of the projection screen, about which the projection screen can move with respect to the housing. However, in other contemplated embodiments, the magnet could be disposed below the articulation point while still remaining outside of the housing.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
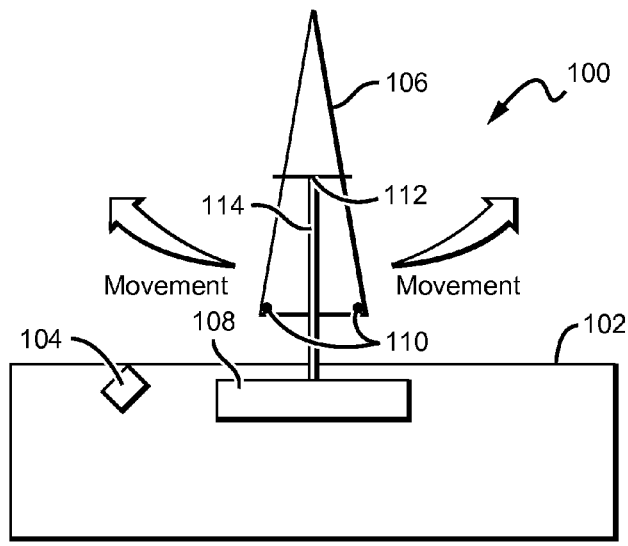
FIGS. 1-6 are schematics showing vertical cross-section views of various embodiments of electric lighting devices.

FIG. 1 illustrates one embodiment of an electric lighting device 100 that simulates a flickering flame. Device 100 can include a housing 102 and a projection screen 106 at least partially extending from the housing 102. Housing 102 preferably resembles a traditional wax candle, although it could include other form factors such as a light bulb appearance. Projection screen 106 preferably is coupled to housing 102 at an articulation point 112 disposed outside of the housing about which the projection screen 106 can move with respect to the housing 102. Here, projection screen 106 is coupled to housing via pole 114, which can advantageously be constructed to resemble a wick of a traditional wax candle.

In some contemplated embodiments, the projection screen 106 can rest on the top of the pole 114 such that the projection screen 106 could rotate and/or tilt. In other embodiments, the projection screen 106 could be coupled to the pole 114 via a wire that passes through a hole in a portion of the projection screen 106.

Projection screen 106 may have a tear-drop or other shape to simulate the look of a flame. The specific construction and/or materials comprising the projection screen can vary, and is further discussed below. For example, the screen could be opaque, translucent, or transparent, or combinations thereof In addition, the projection screen could have multiple layers and/or multiple materials composing the projection screen. It is also contemplated that the projection screen can have multiple faces, such as three or more faces, and could comprise various shapes including a cone, a sphere, or an inverted tear drop, for example.

One or more light sources 104 can be disposed within housing 102 such that light is emitted on to an outer surface of the projection screen 106. Although shown as emitting light upwardly, the light may be emitted downwardly depending on the orientation of the device and the location of the light source. Light source 104 preferably comprises one or more LEDs but could alternatively comprise other light sources. It is especially preferred that the light source comprise a set of micro-LEDs to allow for additional colors of light to be emitted in the space required by a traditional LED. In such embodiments, it is especially preferred that the lights comprise RGB lights such that a variety of colors of light could be produced. One or more lenses can be used to collect and focus the light on to the projection screen 106.

Device 100 can further include an electromagnet 108 configured to generate a time-varying electromagnetic field and thereby cause movement of the projection screen 106 with respect to the housing 102. It is contemplated that the electromagnet can include a coil of wire and timer circuitry that collectively generate the electromagnetic field over time according to a predefined waveform. A description of various waveforms can be found in co-pending U.S. patent publication no. 2013/0286642 to Candella, LLC.

Rather than an electromagnet, it is contemplated that a fan, motor, or other drive mechanism could cause movement of the projection screen 106. A discussion of fan-based devices can be found in WIPO patent application having Ser. No. PCT/US13/65,284 filed on Oct. 16, 2013.

Projection screen 106 preferably includes one or more magnets 110 that interact with the time-varying electromagnetic field and thereby cause movement of the projection screen 106 with respect to the housing 102. The magnets 110 could be inserted into recesses within the projection screen 106 or more preferably during injection molding of the projection screen 106. Preferably, the magnets can be molded in using dual injection molding. By disposing magnets 110 proximate to the electromagnet 108, the power needed to cause movement of the projection screen 106 can thereby be reduced, which can advantageously increase the battery life of device 100 in battery operated versions.

As shown in FIG. 1, magnets 110 are disposed outside of the housing 102 in the portion of the projection screen 106 extending from the housing 102. This advantageously allows a height of the device 100 to be substantially reduced and thereby reduce the cost of manufacture as well as allow for additional form factors such as a tea light candle.

With the articulation point 112 and magnets 110 disposed outside of the housing, the hole in the upper portion of the housing 102 can be eliminated. This allows for outdoor versions of products where water or other elements of nature may otherwise damage device 100. In addition, it is contemplated that the housing 102 could be hermetically sealed to prevent water ingress, which would allow for other products such as a floating candle. In such embodiments, it is contemplated that the device 100 could be charged via induction or be disposable.

Figure 2:
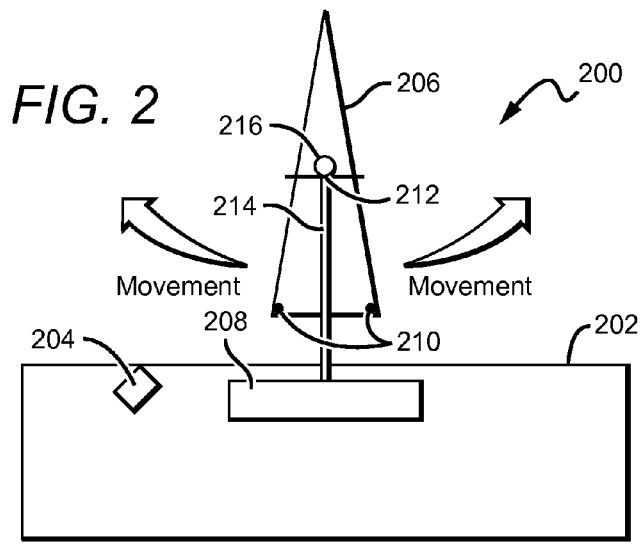

FIG. 2 illustrates another embodiment of an electric lighting device 200 that simulates a flickering flame, which also includes a light source 216 disposed above the articulation point 212. In such embodiments, it is contemplated that the pole 214 could either have an embedded wire or itself be electrically conductive to provide power to the light source 216. With respect to the remaining numerals in FIG. 2, the same considerations for like components with like numerals of FIG. 1 apply.

Figure 3:
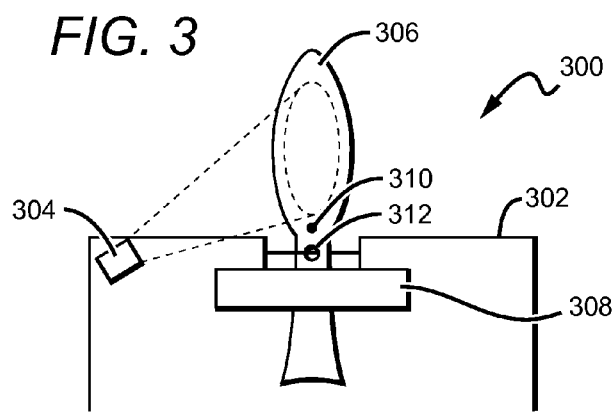

In FIG. 3, another embodiment of an electric lighting device 300 is shown in which the articulation point 312 is disposed below the magnet(s) 310, and having the electromagnet 308 disposed below the articulation point 312. Preferably, the coil of electromagnet 308 is disposed about the projection screen 306 and has a diameter sufficient to allow for movement of the projection screen 306 within the diameter of the coil. With respect to the remaining numerals in FIG. 3, the same considerations for like components with like numerals of FIG. 1 apply.

Figure 4:
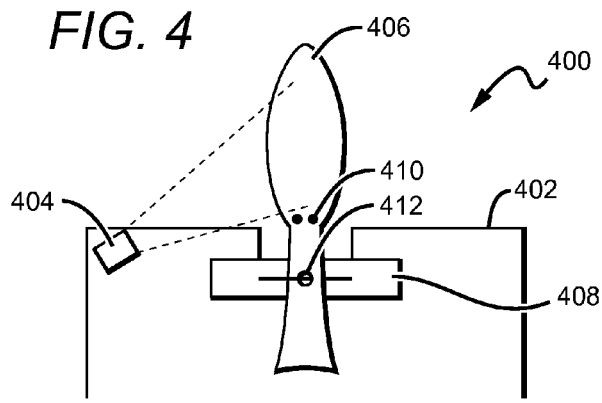

FIG. 4 illustrates yet another embodiment of an electric lighting device 400 in which the articulation point 412 is disposed below the magnet(s) 410, and having the electromagnet 408 disposed at the articulation point 412. With respect to the remaining numerals in FIG. 4, the same considerations for like components with like numerals of FIG. 1 apply.

Figure 5:
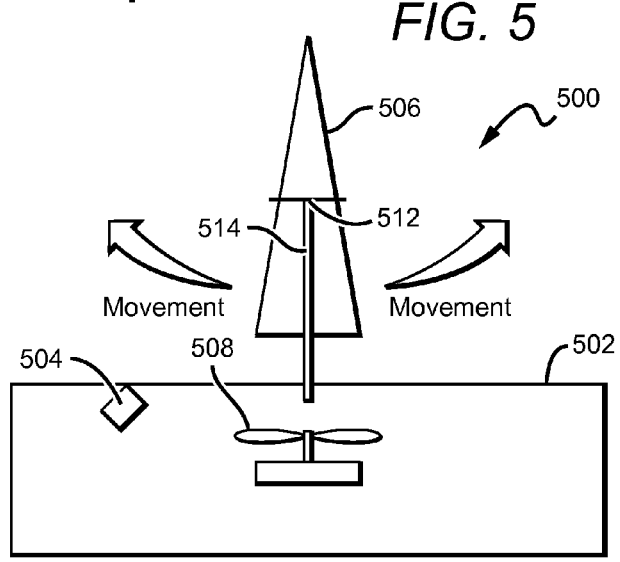

FIG. 5 illustrates another embodiment of an electric lighting device 500 having a fan 508 that causes movement of the projection screen 506 as the fan rotates. Because of the upward airflow, in some embodiments, the projection screen 506 can include one or more weights or be composed of a heavier material to ensure it remains coupled to pole 514. With respect to the remaining numerals in FIG. 5, the same considerations for like components with like numerals of FIG. 1 apply.

Figure 6:
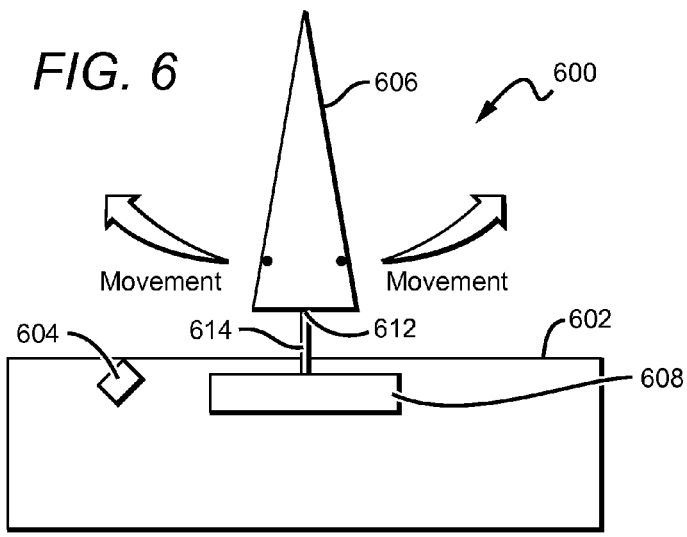

In FIG. 6, another embodiment of an electric lighting device 600 is shown that simulates a flickering flame, in which the articulation point 612 is outside of the housing 602 but below the magnets 610. The coil 608 is disposed within the housing 602 below the articulation point 612 and magnets 610. With respect to the remaining numerals in FIG. 6, the same considerations for like components with like numerals of FIG. 1 apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An electric lighting device that simulates a flickering flame, comprising:
   a housing;
   a projection screen coupled to the housing such that at least a portion of the projection screen extends from the housing, wherein the projection screen comprises a magnet within the portion of the projection screen extending from the housing;
   a rod extending from an upper portion of the housing, wherein the projection screen is suspended on the rod such that the projection screen can move with respect to the housing, and wherein the projection screen is entirely disposed outside of the housing;
   a light source that emits light on to a surface of the projection screen;
   an electromagnet configured to generate a time-varying electromagnetic field; and
   wherein the projection screen is movably mounted and comprises an articulation point about which the projection screen can move with respect to the housing, and wherein the articulation point is outside of the housing.

2. The device of claim 1, wherein the magnet is disposed above the articulation point.

3. The device of claim 1, wherein the electromagnet is disposed at or above the articulation point.

4. The device of claim 1, wherein the electromagnet is disposed below the articulation point.

5. The device of claim 1, wherein the magnet is disposed above the articulation point.

6. The device of claim 1, wherein the rod is configured to resemble a wick of a traditional wax candle.

7. The device of claim 1, wherein the magnet is molded into the projection screen.

8. The device of claim 1, wherein the electromagnet is disposed within the housing immediately below the upper surface.

9. The device of claim 1, wherein the upper surface comprises a closed surface.

10. The device of claim 9, wherein the housing is hermetically sealed.

11. An electric lighting device that simulates a flickering flame, comprising:
   a housing that includes an upper surface;
   a projection screen coupled to the housing at an articulation point about which the projection screen can move with respect to the housing, wherein the projection screen is disposed above the upper surface of the housing;
   a rod from the upper surface of the housing, and wherein the projection screen is suspended on the support rod such that the projection screen can move with respect to the housing;
   a magnet disposed at least partially within the projection screen;
   a light source at least partially disposed within the housing and that emits light on to an outer surface of the projection screen;
   an electromagnet configured to generate a time-varying electromagnetic field and disposed within the housing beneath the upper surface; and
   wherein the magnet is disposed below the articulation point and outside of the housing.

12. The device of claim 11, wherein the projection screen is configured to rest on the rod at the articulation point about which the projection screen can move with respect to the housing, and wherein the magnet is disposed above the articulation point.

13. The device of claim 12, wherein the articulation point is outside of the housing.

14. The device of claim 12, wherein the magnet is disposed above the articulation point.

15. The device of claim 11, wherein the rod is configured to resemble a wick of a traditional wax candle.

16. The device of claim 11, wherein the magnet is molded into the projection screen.

17. The device of claim 11, wherein the electromagnet is disposed within the housing immediately below the upper surface.

18. The device of claim 11, wherein the upper surface comprises a closed surface.

19. The device of claim 18, wherein the housing is hermetically sealed.

* * * * *